(12) United States Patent
Schneider et al.

(10) Patent No.: US 7,966,107 B2
(45) Date of Patent: Jun. 21, 2011

(54) GUIDANCE SYSTEM FOR MANUALLY GUIDED VEHICLES

(75) Inventors: Klaus Schneider, Hergatz (DE); Oliver Sawodny, Stuttgart (DE); Eckard Arnold, Ilmenau (DE)

(73) Assignee: Liebherr-Werk Nenzing GmbH, Nenzing (AT)

( * ) Notice: Subject to any disclaimer, the term of this patent is extended or adjusted under 35 U.S.C. 154(b) by 1135 days.

(21) Appl. No.: 11/441,820

(22) Filed: May 26, 2006

(65) Prior Publication Data
US 2006/0271253 A1  Nov. 30, 2006

(30) Foreign Application Priority Data
May 30, 2005  (DE) .......................... 10 2005 024 620

(51) Int. Cl.
*G01C 21/00* (2006.01)
(52) U.S. Cl. .......................................... 701/26; 701/210
(58) Field of Classification Search .................... 701/207
See application file for complete search history.

(56) References Cited

U.S. PATENT DOCUMENTS

| | | | |
|---|---|---|---|
| 5,719,771 A * | 2/1998 | Buck et al. ................. | 455/456.5 |
| 5,904,727 A * | 5/1999 | Prabhakaran ................. | 701/208 |
| 6,240,362 B1 * | 5/2001 | Gaspard, II ................... | 701/209 |
| 6,401,078 B1 * | 6/2002 | Roberts et al. ................. | 705/28 |
| 6,801,226 B1 * | 10/2004 | Daughtrey ................... | 715/763 |
| 6,879,962 B1 * | 4/2005 | Smith et al. ................... | 705/22 |
| 7,684,994 B2 * | 3/2010 | Kodger, Jr. ................... | 705/333 |
| 2002/0103728 A1 * | 8/2002 | Naghshineh et al. ........... | 705/29 |
| 2002/0138352 A1 * | 9/2002 | DeMaggio ..................... | 705/22 |
| 2002/0171650 A1 * | 11/2002 | Prabhakaran ................. | 345/530 |
| 2004/0039597 A1 * | 2/2004 | Barts et al. ........................ | 705/1 |
| 2004/0054554 A1 * | 3/2004 | Barts et al. ........................ | 705/1 |
| 2004/0073448 A1 * | 4/2004 | Barts et al. ........................ | 705/1 |
| 2004/0107111 A1 * | 6/2004 | Barts et al. ........................ | 705/1 |
| 2004/0158355 A1 * | 8/2004 | Holmqvist et al. ........... | 700/245 |
| 2005/0015288 A1 * | 1/2005 | Reeves et al. ..................... | 705/8 |
| 2005/0251330 A1 * | 11/2005 | Waterhouse et al. .......... | 701/204 |
| 2005/0288986 A1 * | 12/2005 | Barts et al. ........................ | 705/9 |
| 2006/0089787 A1 * | 4/2006 | Burr et al. ..................... | 701/202 |
| 2006/0229895 A1 * | 10/2006 | Kodger, Jr. ......................... | 705/1 |
| 2007/0016363 A1 * | 1/2007 | Huang et al. .................. | 701/201 |

\* cited by examiner

*Primary Examiner* — Thomas G. Black
*Assistant Examiner* — Shelley Chen
(74) *Attorney, Agent, or Firm* — Alleman Hall McCoy Russell & Tuttle LLP

(57) ABSTRACT

A guidance system for manually guided vehicles such as reach stackers or straddle carriers is disclosed. In accordance with the disclosure, the position of the vehicles is permanently automatically detected and supplied to a guiding system for carrying out. Starting from transport job lists made available externally, the travel jobs are assigned to the individual vehicles in an optimized form. Suitable travel routes for the travel jobs are determined and the travel jobs, including the travel routes, are automatically transferred to the vehicle operators. Their carrying out is monitored.

13 Claims, 1 Drawing Sheet

GUIDANCE SYSTEM FOR MANUALLY GUIDED VEHICLES

CROSS-REFERENCE TO RELATED APPLICATION

This application claims priority to German Patent Application Serial No. 10 2005 024 620.6, filed on May 30, 2005, the disclosure of which is hereby incorporated by reference in its entirety for all purposes.

FIELD

The present disclosure relates to a guidance system for manually guided vehicles such as reach stackers or straddle carriers.

BACKGROUND AND SUMMARY

Up to now, the journeys of manually guided load-carrying vehicles such as reach stackers, straddle carriers or other load-carrying vehicles have been guided manually; for example, on load transfers in the port. However, a large number of empty journeys result from this independent guidance of the individual vehicles. A transfer job is thus frequently processed with one vehicle, for example with a reach stacker, and the vehicle subsequently travels back to the starting point.

DETAILED DESCRIPTION

Figure 1:
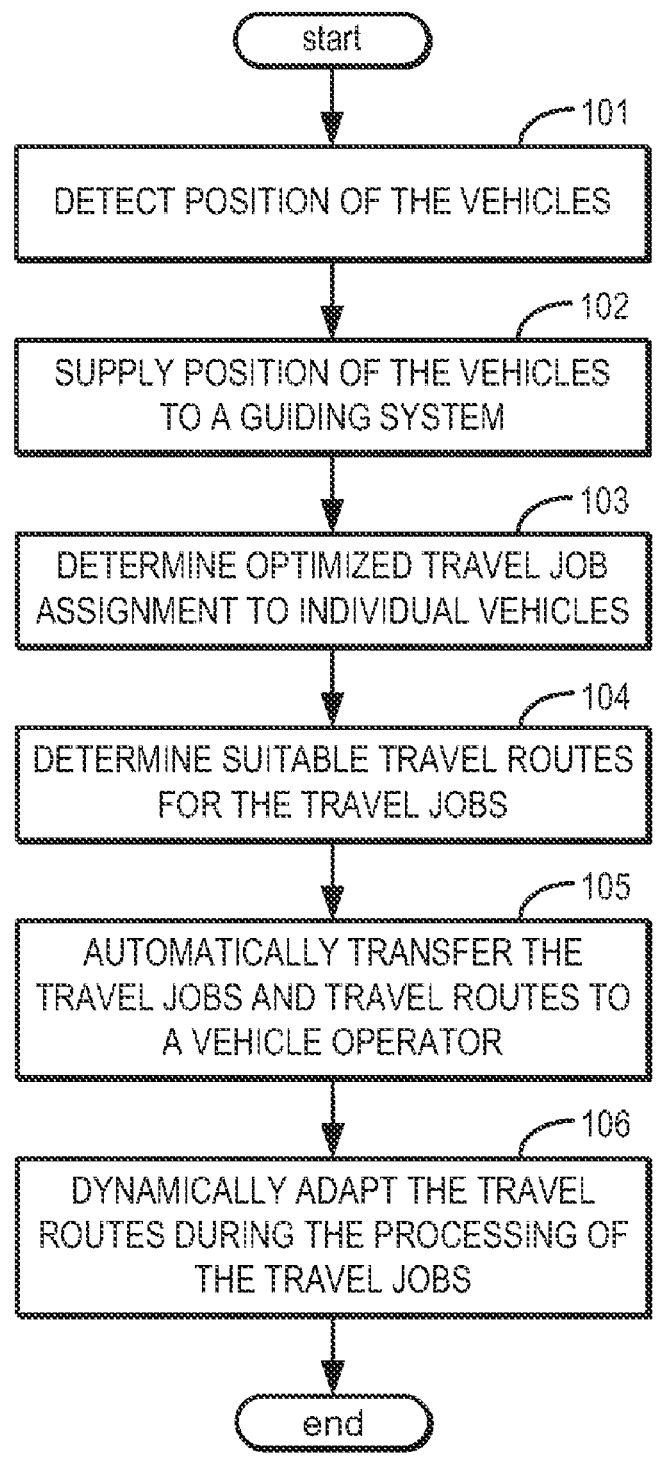
FIG. 1 shows a flowchart of a guidance system and method for manually guided vehicles such as reach stackers or straddle carriers.

It is the object of the disclosure to provide a guidance system for manually guided vehicles with which the deployment of the vehicles should be optimized, that is, the number of empty journeys should be reduced as far as possible.

This object is solved in accordance with the present disclosure by a guidance system for manually guided vehicles such as reach stackers or straddle carriers in accordance with the combination of the features of claim 1. As illustrated in FIG. 1, at 101 the position of the vehicles is permanently automatically detected and recorded in accordance with the present disclosure. At 102, the position of the vehicles is supplied and made available to the guidance system for evaluation. Starting from transport job lists made available externally, at 103, an optimized travel job assignment, or vehicle job allocation, to the individual vehicles is carried out. At 104, suitable travel routes are determined for the travel jobs. The travel jobs, including the travel routes, are automatically transferred, or communicated, to the vehicle operators at 105, and their carrying out is monitored. At 106, the travel routes are dynamically adapted during the processing of the travel jobs, wherein the scheduling and routing of the travel jobs takes into account the travel jobs currently being processed. This system is in particular suitable for container transport in port operation.

Shortened travel paths, a reduction in the processing time of the transport jobs, or an increase in the transport capacity of the overall system can thus be achieved by reduction of the empty journeys compared to a manual guiding of the vehicle route.

Advantageous aspects result from the dependent claims following on from the main claim.

Accordingly, the load taken up by the vehicle can be identified automatically by means of image processing.

In a static system, the travel paths can be communicated to the vehicles with the travel jobs and can subsequently no longer be changed.

An alternative results in dynamic routing in that the travel paths are adapted during the processing of the travel jobs.

A dynamic simulation model can advantageously be connected via an interface.

A database system can be provided for the monitoring of the dynamic routing.

The guidance system in accordance with the present disclosure permits the reduction of the investment costs and of the operating costs. This results from the fact that a lower number of vehicles are used. On the other hand, the throughput is increased and the personnel requirements are reduced. With dynamic routing, the number of traffic paths is reduced and so the stack capacity increased. An automatic position detection increases the data quality by detecting the actual position of the individual load, that is, for example, of the individual containers.

A so-called terminal control and information system, which represents a management level, is present in a master role. A central planning and routing system, the so-called control level, is associated with it via a system interface. The former is connected to the individual vehicles in the so-called process execution level via a WLAN connection. The individual placement positions can be reported back to the terminal control and information system by the vehicles and can be stored in a data store there.

In an exemplary embodiment, the individual vehicles are equipped with devices for precise position detection, for example on the basis of GPS. The corresponding vehicles can communicate automatically with the guiding system. These onboard units are connected to the control level via WLAN.

The decisive functionalities in connection with the processing of travel jobs include:
- the permanent detection and cyclic transfer of the vehicle position to the vehicle system; and
- the transfer, management and visualization of travel jobs; and
- the possibility of the precise detection of container placement positions and their transfer into the terminal control and information system, whereby an increase in data quality is achieved compared to a manual detection.

The guiding system takes over transport jobs from the terminal control and information system and calculates an optimized order and an allocation of travel jobs to the individual vehicles (so-called scheduling) as well as optimized travel paths for the processing of travel jobs (so-called routing), while taking account of
- the current vehicle position;
- the travel jobs currently being processed; and
- the performance and availability data.

In addition, methods of operations research can be used. These include, for example, time-based solutions of traveling salesman problems and further discrete optimization processes.

The criteria of the optimization such as the optimization horizon, that is the number of the future transport jobs taken into account in the optimization, are adapted to the specific conditions of use.

Stepped strategies can be used for the determination and assignment of the travel paths (routing).

For instance, in static routing, the travel paths are communicated to the vehicles with the travel jobs and are subsequently no longer changed. The calculation of the travel paths can take place with or without a taking account of the travel paths of the remaining vehicles. The priority rules at crossroads and one-way street rules are fixed in advance and are not dynamically influenced by the system. Advance examinations in simulation models assist the selection of the travel paths.

An alternative exists in dynamic routing. The vehicle paths are adapted during the processing of the travel jobs there. The priority rules at crossroads and one-way street rules are fixed dynamically by the system. Adapted anti-collision strategies are taken into account due to safety demands. So-called fallback solutions are programmed for the event of communication breakdowns.

The travel jobs and travel routes are automatically transferred to the vehicles and visualized there. The operator acknowledges the take over and the completion of travel jobs. The data of this travel job management are in turn automatically aligned with the guiding system.

The job order and the job assignment are optimized by the present disclosure, with a reduction in empty travel jobs and the forming of travel job cycles being brought about. The optimization of the travel paths directly reduces the required processing times of transport jobs. A further turnover increase can be achieved by the combined observation of both partial jobs as an integrated optimization job.

Dynamic simulation models and transfer processes can be used during the development of the process, but also for advance examinations and adaptations in a specific terminal system.

The guiding system particularly advantageously has an independent database whose job includes the transport and travel job management, the vehicle data management and the management of layout information and system parameters. The required structure of the database system has to be prepared and any required structuring has to be carried out in the real time database, job database and archive database in the course of the project processing.

The interface to the terminal control and management system can be realized in dependence on the use in the form of a standard interface of a transport job management, but also as a simple transport job list or as an SQL based database combination with the terminal control and management system. Optimized travel jobs and travel routes for the individual vehicles are generated in the optimization module on the basis of the transport jobs.

The vehicle detection and management includes the evaluation of the transferred position data and speed data in addition to the communication with the individual vehicles.

The graphical user interface allows user intervention in the job management as well as a visualization of the planned vehicle movements. A report generator can be present which takes over the evaluation and monitoring of the operation of the total unit and the data archiving.

The interface to a simulation system serves the optimum connection of a dynamic simulation model, which assists the parameter tuning or supplies information on the static routing before and during the putting into operation.

A special database system is provided in accordance with the present disclosure for the realization and monitoring of a dynamic routing which takes account of the increased demands on real time capability and safety-relevant functionalities.

The invention claimed is:

1. A guidance system for manually guided vehicles comprising reach stackers or straddle carriers, where
   a position of the vehicles is permanently automatically detected and supplied to a guiding system for evaluation;
   starting from transport job lists made available externally, an optimized travel job assignment to individual vehicles takes place;
   suitable travel routes and schedules are determined for the travel jobs;
   the travel jobs, including the travel routes, are automatically transferred to a vehicle operator and their carrying out is monitored; and
   the travel routes are dynamically adapted during the processing of the travel jobs, wherein a scheduling and routing of the travel jobs takes into account the travel jobs currently being processed.

2. A guidance system in accordance with claim 1, wherein a load taken up by a vehicle is automatically identified by means of image processing.

3. A guidance system in accordance with claim 1, wherein a dynamic simulation model is connected via an interface.

4. A guidance system in accordance with claim 1, wherein a database system is present to monitor the dynamic adapting.

5. The system of claim 1, wherein the dynamic adapting includes routing according to priority rules at crossroads and one-way street rules.

6. The system of claim 1, wherein the adapting includes adapting the travel route of a vehicle during the processing of the travel job taking account of the travel route of one or more remaining vehicles.

7. A guidance system for deploying a plurality of manually guided vehicles comprising reach stackers or straddle carriers, comprising:
   a terminal control and information system, a central planning and routing system, and a device for precise position detection associated with each vehicle, wherein the control and information system and the central planning and routing system are configured to permanently automatically detect a position of each vehicle via the device for precise position detection, to determine an optimized travel job assignment for each vehicle starting from transport job lists; to determine suitable travel routes for the travel jobs, and to automatically transfer the travel jobs, including the travel routes, to vehicle operators, and wherein upon the guidance system's central planning and routing system taking over the travel jobs from the terminal control and information system, dynamically adapted travel routes and schedules are determined taking into account travel jobs currently being processed.

8. The guidance system of claim 7, wherein the terminal control and information system and the central planning and routing system are further configured to monitor a carrying-out of the travel jobs.

9. The guidance system of claim 7, further comprising image processing equipment for identifying a load taken up by a vehicle.

10. A method for deploying a plurality of manually guided reach stacker and straddle carrier vehicles, comprising:
    permanently automatically detecting a position of the vehicles;
    supplying the position of the vehicles to a guiding system for evaluation;
    determining an optimized travel job assignment for the individual vehicles starting from transport job lists made available externally;
    adapting suitable travel routes for the travel jobs by adapting the travel route of each individual vehicle during the processing of the travel job taking account of the travel route of one or more remaining vehicles; and automatically transferring the travel jobs, including the travel routes, to a vehicle operator.

11. The method of claim 10, further comprising monitoring a carrying-out of the travel jobs.

12. The method of claim 10, further comprising identifying a load taken up by a vehicle via image processing means.

13. The method of claim 10, wherein adapting suitable travel routes includes adapting the travel route of each individual vehicle based on priority rules at crossroads and one-way street rules.

\* \* \* \* \*